US009694532B2

(12) United States Patent
McKenzie et al.

(10) Patent No.: US 9,694,532 B2
(45) Date of Patent: Jul. 4, 2017

(54) FUEL ADDITIVE BOTTLE FOR COMPATIBILITY WITH CAPLESS FUEL TANK

(71) Applicant: ILLINOIS TOOL WORKS, Glenview, IL (US)

(72) Inventors: John Samuel McKenzie, Aurora, OH (US); Nicholas Emile Stanca, Westlake, OH (US); Bernard Kwame Asante, Spring, TX (US)

(73) Assignee: ILLINOIS TOOL WORKS, Glenview, IL (US)

( * ) Notice: Subject to any disclaimer, the term of this patent is extended or adjusted under 35 U.S.C. 154(b) by 18 days.

(21) Appl. No.: 14/680,728

(22) Filed: Apr. 7, 2015

(65) Prior Publication Data
US 2015/0298384 A1 Oct. 22, 2015

Related U.S. Application Data

(60) Provisional application No. 61/980,141, filed on Apr. 16, 2014.

(51) Int. Cl.
*B29C 49/20* (2006.01)
*B29C 49/04* (2006.01)
(Continued)

(52) U.S. Cl.
CPC ............ *B29C 49/20* (2013.01); *B29C 49/04* (2013.01); *B29C 49/06* (2013.01); *B29C 49/08* (2013.01); *B65D 1/023* (2013.01); *B65D 1/0246* (2013.01); *B67D 7/0288* (2013.01); *B29C 2049/2043* (2013.01); *B29K 2067/003* (2013.01);
(Continued)

(58) Field of Classification Search
CPC B65D 1/02; B65D 1/023; B60K 2015/03348; B60K 2015/0429; B67D 7/42; B67D 4/421
USPC .................... 215/44, 276; 141/350; D9/523; 222/567
See application file for complete search history.

(56) References Cited

U.S. PATENT DOCUMENTS

D130,208 S    8/1872  Frank
D30,134 S     2/1899  Olsen
(Continued)

OTHER PUBLICATIONS

Rislone News Release on Concentrated Fuel Additives Post Show "Rislone Introduces Six Super Concentrated Fuel Additives", Media Contact: Kristen Simpson, Simpson Communications, LLC, Kristen@simpsoncomm.com; Rislone ISO 9001:2008 Certified, 10386 North Holly Road, Holly, Michigan 48442, USA; www.rislone.com.; 2 pages.
(Continued)

*Primary Examiner* — Timothy L Maust
(74) *Attorney, Agent, or Firm* — Avery N. Goldstein; Blue Filament Law PLLC

(57) ABSTRACT

A bottle for dispensing fluids into a capless filler system, the bottle configured with an elongated smooth neck designed for insertion into a capless filler opening to actuate and displace one or more flapper seals when emptying the fluid into the capless filler. The bottle is sealed with a cap with a first set of screw threads that engages the neck at a top portion with a second set of screw threads on an interior surface of the top portion of the neck. The cap can be a child proof cap. The bottle can be made of plastic that is clear or opaque.

5 Claims, 10 Drawing Sheets

(51) Int. Cl.
    *B29C 49/06*     (2006.01)
    *B29C 49/08*     (2006.01)
    *B65D 1/02*     (2006.01)
    *B67D 7/02*     (2010.01)
    *B29K 67/00*     (2006.01)
    *B29L 31/00*     (2006.01)

(52) U.S. Cl.
    CPC ............... *B29L 2031/7158* (2013.01); *B65D 2501/0081* (2013.01)

(56) References Cited

U.S. PATENT DOCUMENTS

| | | | |
|---|---|---|---|
| 2,609,955 A | 9/1952 | Moore | |
| 3,476,278 A | 11/1969 | Lollmann | |
| D275,368 S | 9/1984 | du Chambon | |
| 4,671,421 A * | 6/1987 | Reiber | B65D 1/46 215/228 |
| 5,947,310 A * | 9/1999 | Wagner | B65D 23/04 215/219 |
| 6,216,897 B1 | 4/2001 | Wagner | |
| 6,997,336 B2 * | 2/2006 | Yourist | B65D 1/0223 215/10 |
| D526,209 S | 8/2006 | Beard et al. | |
| D591,597 S | 5/2009 | Rica | |
| 7,980,403 B2 | 7/2011 | Martinez | |
| 8,091,724 B2 * | 1/2012 | King | B65D 1/0246 215/330 |
| D653,558 S | 2/2012 | Kania | |
| D664,440 S | 7/2012 | Gonzalez Rodriguez | |
| D676,331 S | 2/2013 | Hartford | |
| D682,704 S | 5/2013 | Reynolds | |
| D682,705 S | 5/2013 | Reynolds | |
| D686,081 S | 7/2013 | Colangelo | |
| D687,307 S | 8/2013 | Lauret | |
| D687,308 S | 8/2013 | Lauret | |
| D687,309 S | 8/2013 | Lemaitre | |
| D687,310 S | 8/2013 | Lemaitre | |
| 9,156,719 B2 * | 10/2015 | Perrone | B65D 1/0246 |
| 2002/0011498 A1 | 1/2002 | Giblin et al. | |
| 2004/0112856 A1 | 6/2004 | Hwang et al. | |
| 2004/0262310 A1 | 12/2004 | Silk | |
| 2006/0151422 A1 * | 7/2006 | Manley | B65D 39/08 215/341 |
| 2008/0017642 A1 * | 1/2008 | King | B65D 1/0246 220/285 |
| 2012/0074092 A1 * | 3/2012 | Devoy | B01F 3/0446 215/40 |
| 2013/0292425 A1 | 11/2013 | Mulry et al. | |
| 2015/0013822 A1 * | 1/2015 | Baker | B65D 1/0246 141/1 |
| 2016/0031697 A1 * | 2/2016 | Zweifel | B67D 7/42 141/1 |

OTHER PUBLICATIONS

Frequently Asked Questions, Rislone Fuel Injector Cleaner Upper Cylinder Lubricant P/N 4701, Bar's Products, 10386 N. Holly Road, Holly, Michigan 48442, USA; e-mail: info@rislone.com, www.rislone.com, 2 pages.

* cited by examiner

SECTION A-A

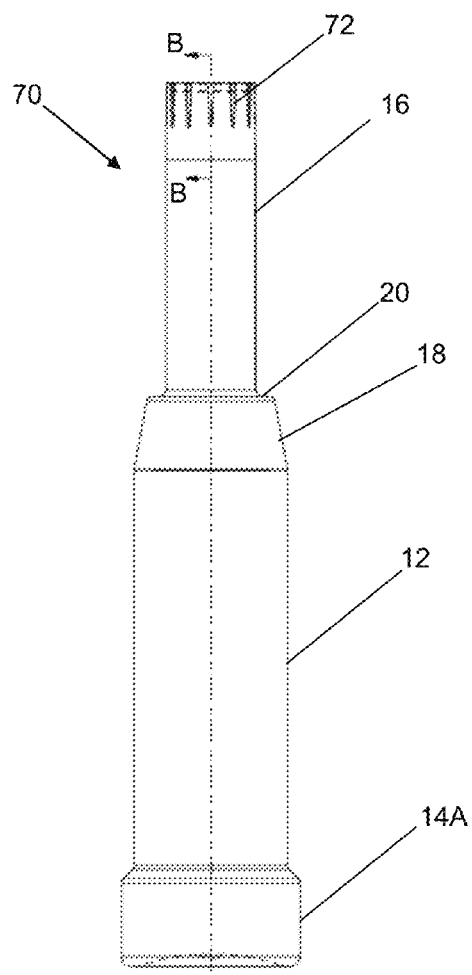
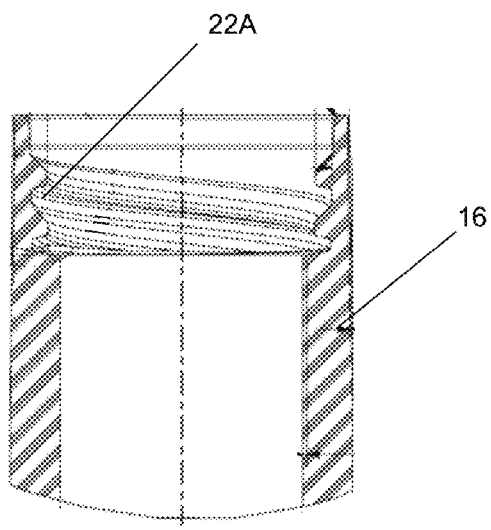
FIG. 4A
FIG. 4B
SECTION B-B
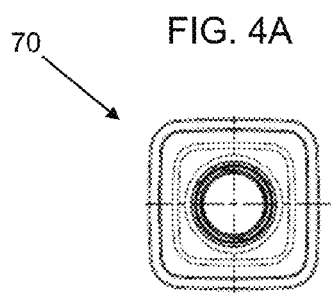
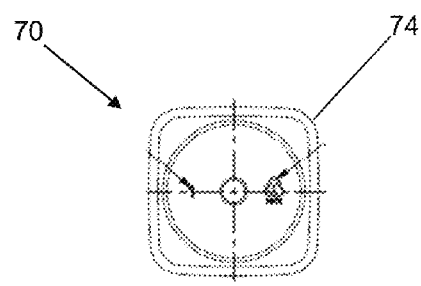
FIG. 4C
FIG. 4D

SECTION C-C

US 9,694,532 B2

FUEL ADDITIVE BOTTLE FOR COMPATIBILITY WITH CAPLESS FUEL TANK

RELATED APPLICATIONS

This application claims priority benefit of U.S. Provisional Application Ser. No. 61/980,141 filed Apr. 16, 2014; the contents of which are hereby incorporated by reference.

FIELD OF THE INVENTION

The present invention in general relates to containers, and in particular to a bottle for dispensing fluids directly into a fuel system filler neck equipped with a capless filler.

BACKGROUND OF THE INVENTION

A recent design trend has been the introduction of capless filler systems for vehicle fuel systems. A capless filler does away with the traditional screw-on fuel cap in favor of an automatic seal which is opened upon the insertion of the nozzle of a fuel hose from a gas station pump. A capless filler has one or more spring loaded flappers that are actuated by the insertion of a nozzle, and the flapper automatically springs back to a closed sealing position with the withdrawal of the inserted nozzle. The seal provided by the spring loaded flapper is generally tighter and more reliable than the traditional screw-on fuel cap, which is important to maintain the pressure in a vehicle fuel system, and to prevent gas fumes from escaping into the environment. FIG. 1 shows a prior art capless filler 64 mounted on the side of a vehicle 62.

Capless fillers provide several benefits to a user including reducing the chance for a gas smell on their hands, since the user simply flips open the fuel door and inserts the pump nozzle in the opening of the capless filler. Not having a twist-on/off gas cap is one less contact with a gasoline-vapor odor source, and prevents the discomfort experienced by people with arthritis or other impairments that make the act of twisting a cap awkward or painful. The possibility of a gas cap dangling and scratching the paint during fueling in eliminated, as well as the embarrassment of a forgotten gas cap left dangling or lost if forgotten by the driver after the refueling stop.

While there are many positive aspects to the use of capless fillers, existing automotive fuel additive packaging, and certain other fuel loading containers are incompatible with the capless mechanism. In general, existing fuel and additive treatment packages and fuel handling containers have external threads that get caught up in the flapper seals, and cannot be retracted after insertion into the filler neck to the gas tank. Furthermore, existing containers are not shaped or contoured for insertion and actuation of flapper seals in a vehicles capless filler system.

Thus, there exists a need for containers that are compatible with capless filler systems for manually dispensing fuel, fuel treatments, fuel additives, and engine treatments into the vehicles fuel system.

SUMMARY OF THE INVENTION

A bottle for dispensing fluids into a capless filler system, the bottle configured with an elongated smooth neck designed for insertion into a capless filler opening to actuate and displace one or more flapper seals when emptying the fluid into the capless filler. The bottle is sealed with a cap with a first set of screw threads that engages the neck at a top portion with a second set of screw threads on an interior surface of the top portion of the neck. The cap may be a child proof cap. The bottle may be made of plastic that is clear or opaque.

A method of for using the bottle is provided that includes opening the bottle by unscrewing the cap from the elongated smooth neck of the bottle, inserting the elongated smooth neck into the capless filler of a vehicle, and retracting the bottle from the capless filler after introducing a liquid held in the bottle.

A method for forming a capless filler bottle is provided that includes placing a threaded insert into an injection mold, introducing a thermoplastic into the injection mold, and wherein the threaded insert forms a set of internal threads on an inner top portion of the elongated smooth neck of the bottle. The thermoplastic is introduced by injection or blow molding, where blow molding is by at least one of extrusion blow molding, injection blow molding, and injection stretch blow molding.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4A is a front view of a bottle with a series of slots or wedges at the top according to an embodiment of the invention;

FIG. 4B is a cross-section view along line B-B of FIG. 4A showing internal cap threads molded into the elongated neck of the bottle according to embodiments of the invention;

FIG. 4C is a top view of the bottle depicted in FIG. 4A;

FIG. 4D is a bottom view of the bottle depicted in FIG. 4A;

Figure 1:
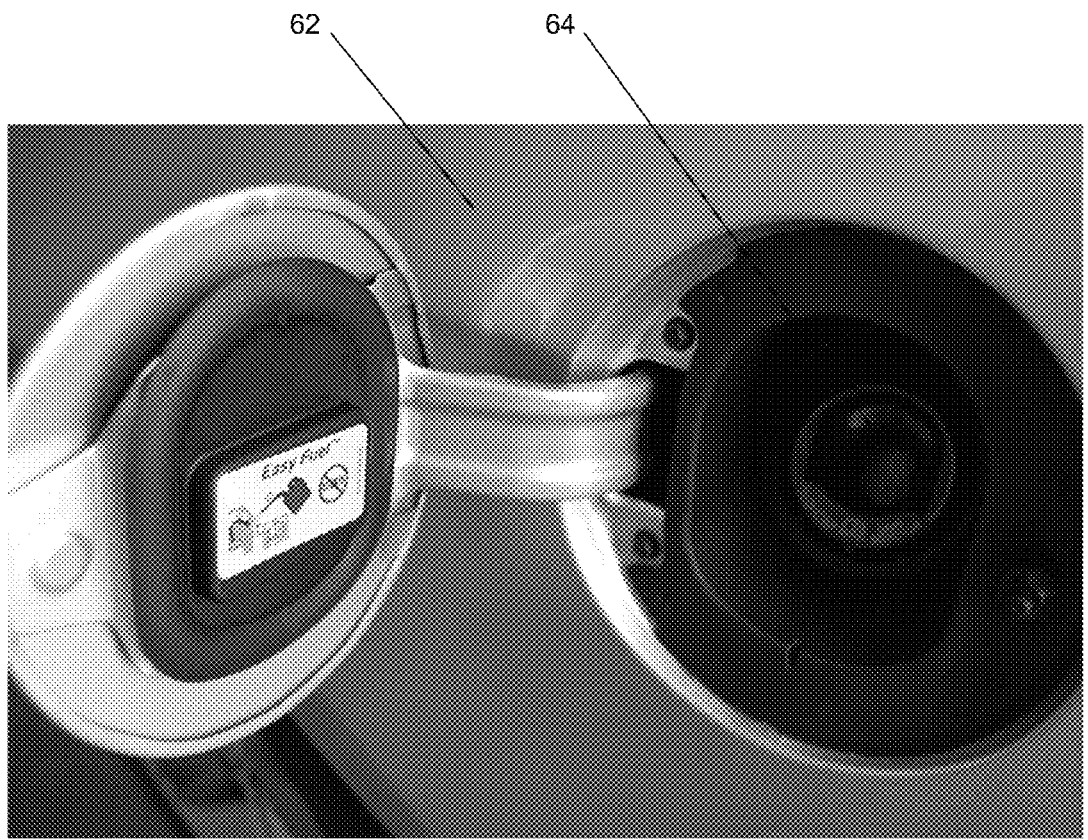
FIG. 1 illustrates a view of a typical prior art capless filler system of a vehicle.

The detailed description explains the preferred embodiments of the invention.

DESCRIPTION OF THE INVENTION

The present invention has utility as a container or bottle for dispensing fuel, fuel additives, and engine treatments into a fuel system equipped with a capless filler. Embodiments of the inventive bottle have an elongated neck dimensioned to allow insertion into the capless filler opening and to actuate and displace one or more flapper seals along the fuel fill tube leading to the vehicle gas tank. In certain embodiments the elongated neck is terminated with a ledge or flared out area that forms a tangible stopping point when inserting the bottle or container into the capless filler of a vehicle fuel system. Furthermore, the base area of embodiments of the inventive bottle or container is widened to serve as a grab point when the bottle is inserted in the fuel system. Embodiments of the inventive bottle have internal threads at the top inner portion of the elongated bottle neck for engagement with a twist off cap, so as to facilitate removal of the inserted bottle from the capless filler. Existing bottle designs with the threads on the exterior perimeter of a bottle top have a tendency to engage the flapper of a capless filler, and the inserted bottle is then hard to retract and remove, and may ultimately get stuck. In a specific embodiment of the inventive bottle, the bottle cap may be a child proof cap.

Embodiments of the inventive container or bottle may be opaque or clear, and formed from various plastics and composites. An example of a thermoplastic that may be used to form embodiments of the inventive bottle is polyethylene terephthalate (PET). Depending on the processing and thermal history of the polyethylene terephthalate, the PET may exist both as an amorphous (transparent) and as a semicrystalline polymer. The semicrystalline material might appear transparent (particle size <500 nm) or opaque and white (particle size up to a few microns) depending on its crystal structure and particle size. PET is a recyclable material.

Embodiments of the inventive bottle may be formed through a blow molding process. Blow molding is a manufacturing process by which hollow plastic parts are formed. In general, there are three main types of blow molding: extrusion blow molding, injection blow molding, and injection stretch blow molding. The blow molding process begins with melting down the plastic and forming it into a parison or in the case of injection and injection stretch blow molding (ISB) a preform. The parison is a tube-like piece of plastic with a hole in one end through which compressed air can pass. The parison is then clamped into a mold and air is blown into it. The air pressure then pushes the plastic out to match the mold. Once the plastic has cooled and hardened the mold opens up and the part is ejected.

Embodiments of the inventive bottle may be formed by placing a threaded insert into an injection mold. In a specific embodiment, the internal threads on the inner wall of the top portion of the neck may be formed during the molding process with a threaded insert that serves as part of the preform injection mold and then the injection molded preform would be heated and formed into the final form.

In other embodiments of the inventive bottle, the inner threads may be tapped with a tool following the bottle's formation. And in still other embodiments, the internal threads may be manufactured by creating a separate component, with the threads included, that would then be joined to the top portion of the neck of the container.

Figure 2A:
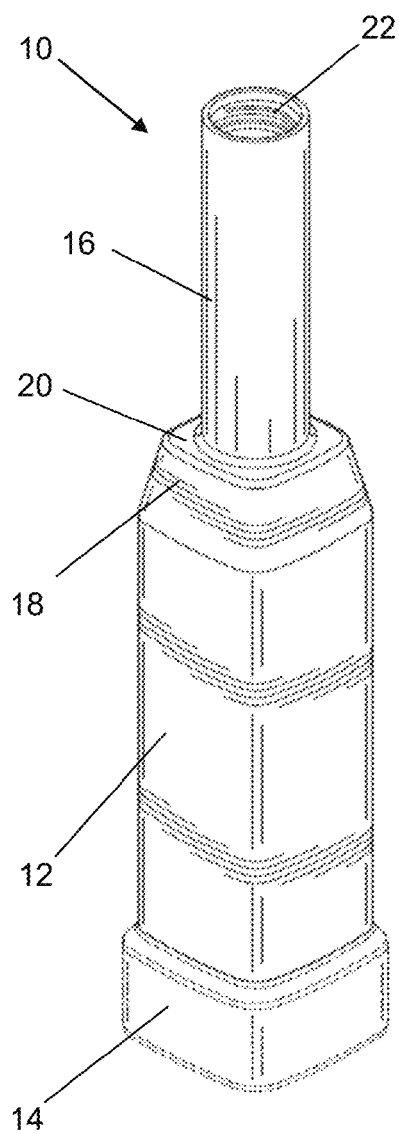
FIG. 2A is a front, upper perspective view of an embodiment of the inventive bottle.
Figure 2B:
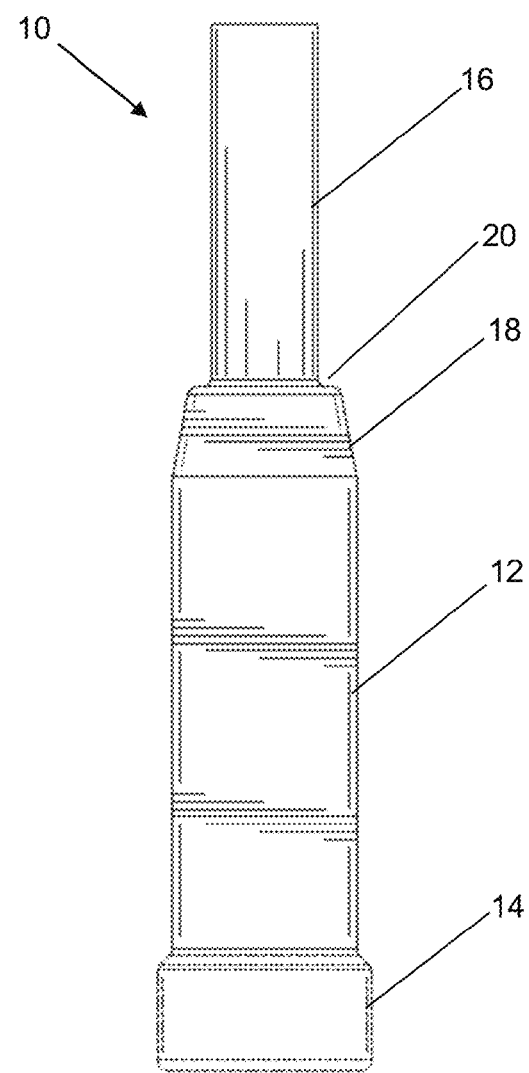
FIG. 2B is a front view of the bottle depicted in FIG. 2A, where side views and the rear view are identical to that depicted in FIG. 2B.
Figure 2C:
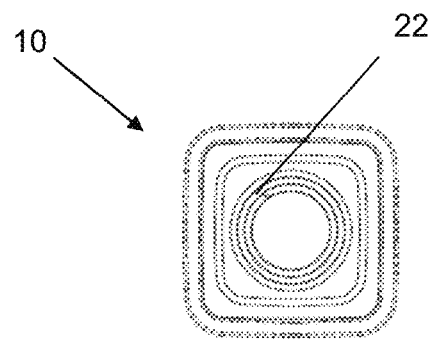
FIG. 2C is a top view of the bottle depicted in FIG. 1.
Figure 2D:
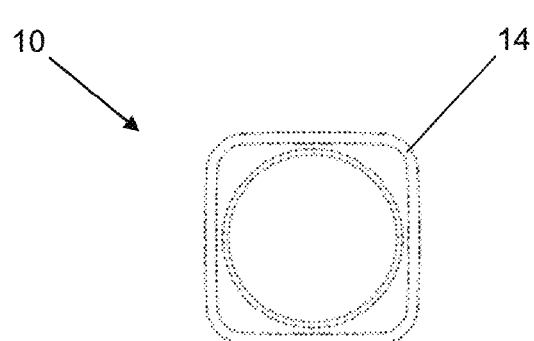
FIG. 2D is a bottom view of the bottle depicted in FIG. 1.
Figures 3A, 3B:
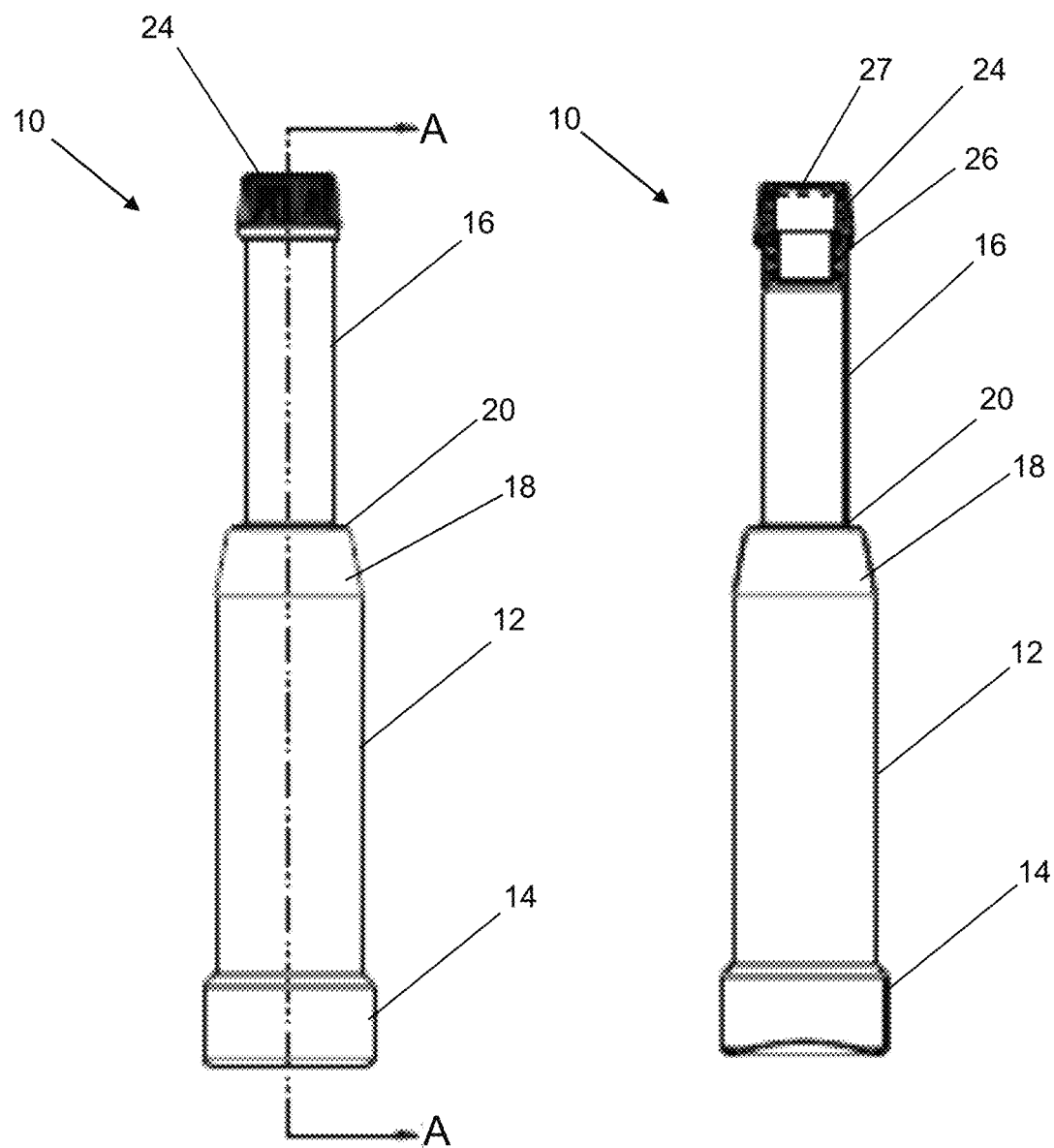
FIG. 3A is a front view of the bottle of FIG. 2A with a cap screwed on according to an embodiment of the invention.
FIG. 3B is a cross-section view along line A-A of FIG. 3A showing the cap attached to the bottle with the cap threads internal to the bottle according to embodiments of the invention.
Figure 5B:
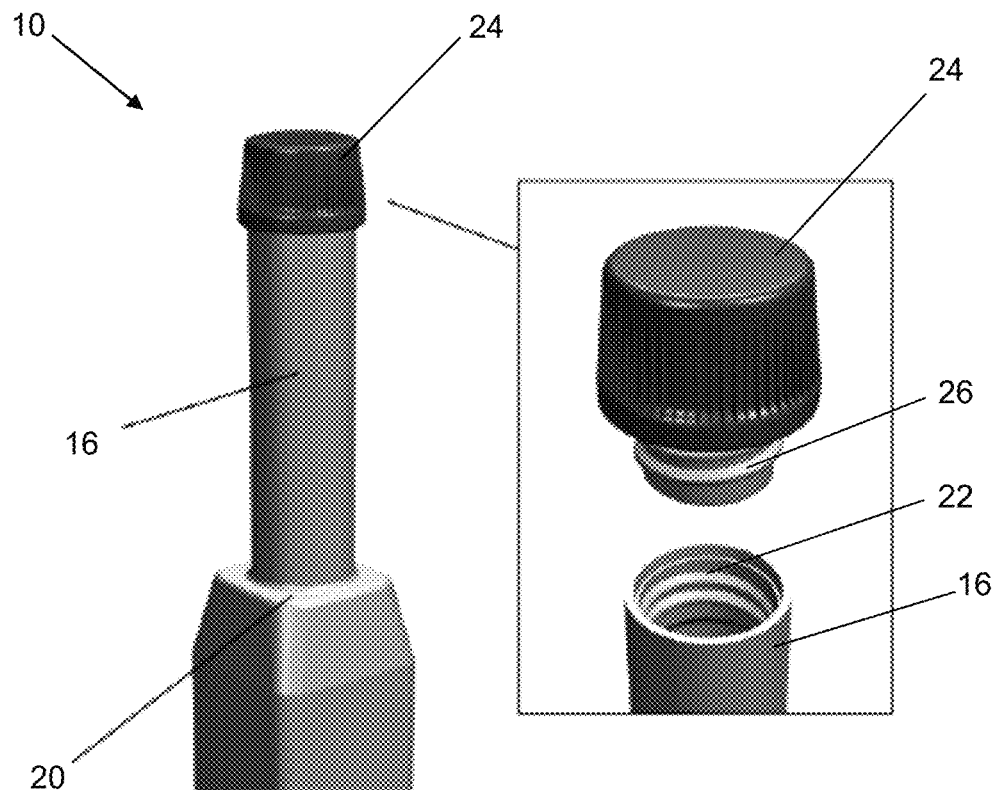
FIG. 5B is a detailed perspective view showing the cap of FIG. 5A detached from the internal threads of the bottle according to an embodiment of the invention.
Figure 5A:
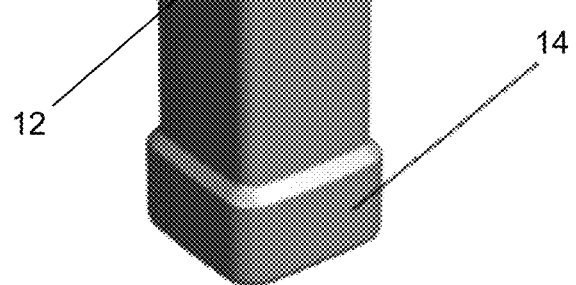
FIG. 5A is a perspective view of the bottle of FIG. 2A with the internal threaded cap attached to the bottle according to an embodiment of the invention.

Referring now to the figures, FIGS. 2A-2D, FIGS. 3A and 3B, and FIGS. 5A and 5B are a series of views of an embodiment of the inventive bottle 10. The bottle 10 has a smooth elongated neck 16 with a circular cross-section that has a top end that has internal threads 22 designed to engage a screw on cap 24 with engagement threads 26 as shown in the cross section A-A of FIG. 3B and as shown in FIG. 5B. The internal threads 22 allow the elongated neck 16 to be completely smooth so as to allow for the ease of insertion and extraction of the bottle 10 from the capless filler system without engaging one or more flapper seals. The engagements 27 are for a child proof cap, which when downward pressure is applied allows the cap 24 to be unscrewed. The bottom of the elongated neck terminates in a ledge 20 and a flared out area 18 that forms a tangible stopping point when inserting the bottle 10 or container into the capless filler of a vehicle fuel system. The flared area 18 terminates to form the cross sectional area of the storage portion 12 of the bottle 10. The bottle 10 has a square storage portion 12 as shown in FIGS. 2C and 2D of the top and bottom views, respectively, however other cross sections for the storage portion 12 are also readily available including circular, triangular, hexagonal, etc. The base area 14 of embodiments of the inventive bottle or container is widened to serve as a grab point when the bottle is inserted in the fuel system.

Figure 4F:
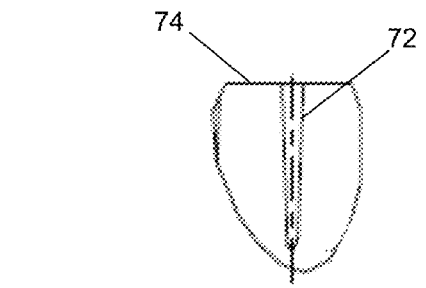
FIG. 4F is a detail view of a slot from the series of slots or wedges in the top portion of the elongated neck according to embodiments of the invention.
Figure 4E:
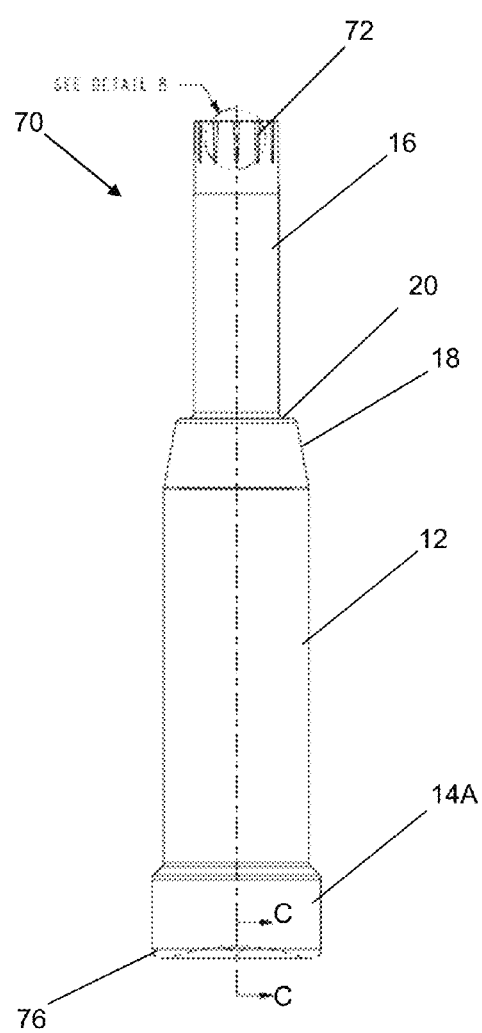
FIG. 4E is a front view of the bottle of FIG. 4A with a series of slots or wedges in detail B and cross section C-C line at the base according to an embodiment of the invention.
Figure 4G:
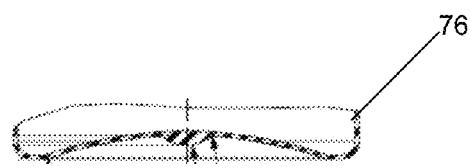
FIG. 4G is a cross section view along line C-C according to embodiments of the invention.
Figure 4H:
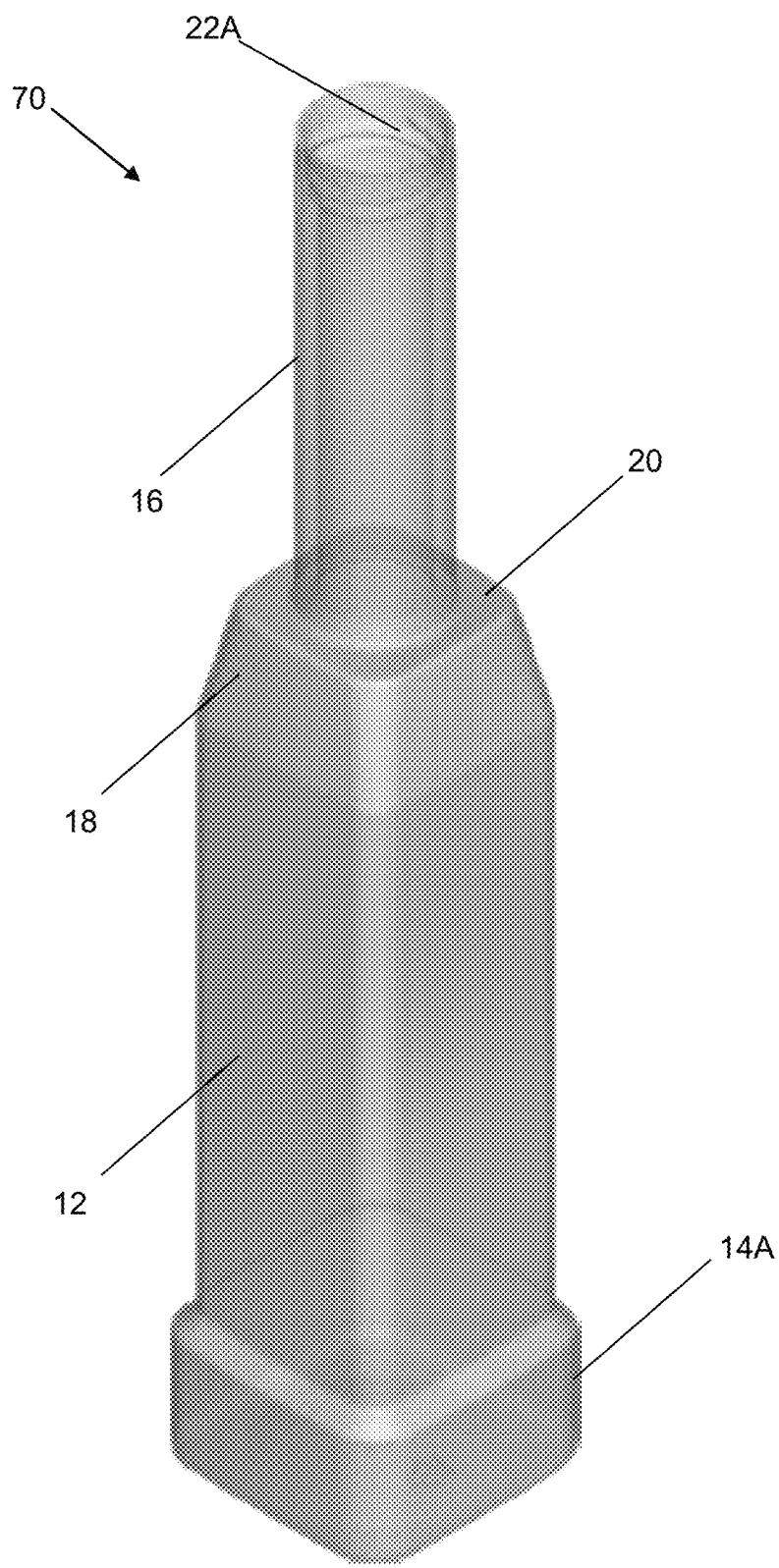
FIG. 4H is a perspective view of the bottle of FIGS. 4A and 4E.

FIGS. 4A-4H are a series of views of an embodiment of the inventive bottle 70 with one or more slots or wedges 72 in the top portion of the elongated neck 16. The bottle 70 has a smooth elongated neck 16 with a circular cross-section that has a top end that has internal threads 22A designed to engage a screw on cap with engagement threads (not shown) in the cross section B-B of FIG. 4B. In a specific embodiment, the internal thread 22A has an M-style thread finish with two threads that start 180° apart. The internal threads 22A allow the elongated neck 16 to be smooth so as to allow for the ease of insertion and extraction of the bottle 70 from the capless filler system without engaging one or more flapper seals. The bottom of the elongated neck 16 terminates in a ledge 20 and a flared out area 18 that forms a tangible stopping point when inserting the bottle 70 or container into the capless filler of a vehicle fuel system. The flared area 18 terminates to form the cross sectional area of the storage portion 12 of the bottle 70. The bottle 70 has a square storage portion 12 as shown in FIGS. 4C and 4D of the top and bottom views, respectively, however other cross sections for the storage portion 12 are also readily available including circular, triangular, hexagonal, etc. The base area 14A of embodiments of the inventive bottle or container is widened to serve as a grab point when the bottle is inserted in the fuel system. In some inventive embodiments slot details are provided on the elongated neck 16 that are sufficiently small so as to not to interfere with the insertion or removal of the bottle from a capless system. FIG. 4F is a detail view of the one or more slots or wedges 72 in the top region of the elongated neck 16. The slot 72 may be straight or have a slight upward taper in the shape of a wedge as the slot 72 extend upward toward the lip 74 at the top of the bottle 70 FIG. 4G is a cross section view of the bottom of the base 76 along section C-C of bottle 70 as shown in FIG. 4E. FIG. 4H is a perspective view of the bottle of FIG. 4A and FIG. 4E with the threads 22A visible.

Figures 6A, 6B:
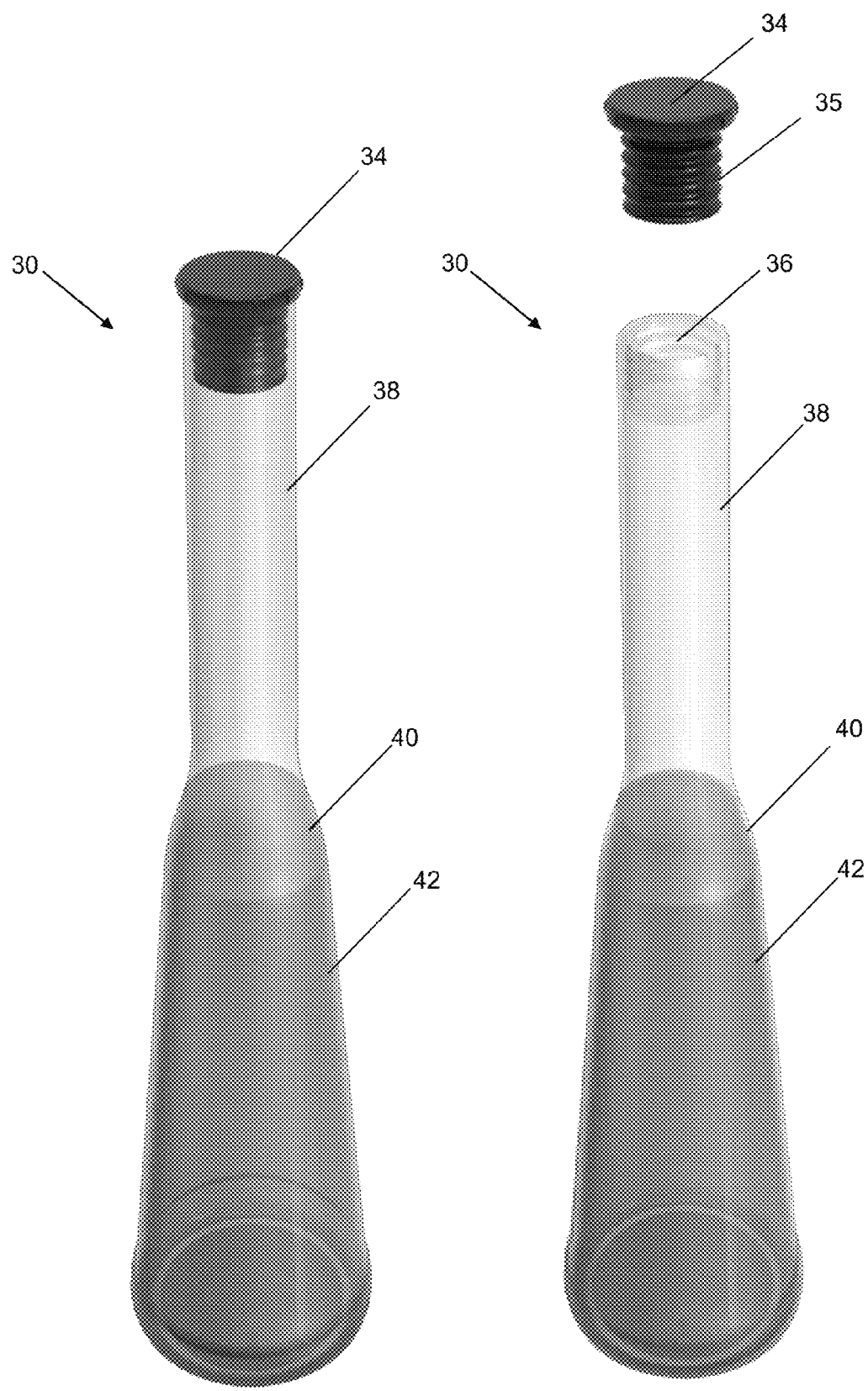
FIG. 6A is a front perspective view of a clear bottle filled with a liquid that has internal threads for securing a cap and an elongated neck for actuating the flapper seals during insertion into a capless filler according to embodiments of the invention.
FIG. 6B is a front view of the liquid filled clear bottle of FIG. 6A with the cap removed according to an embodiment of the invention.
Figures 7A, 7B:
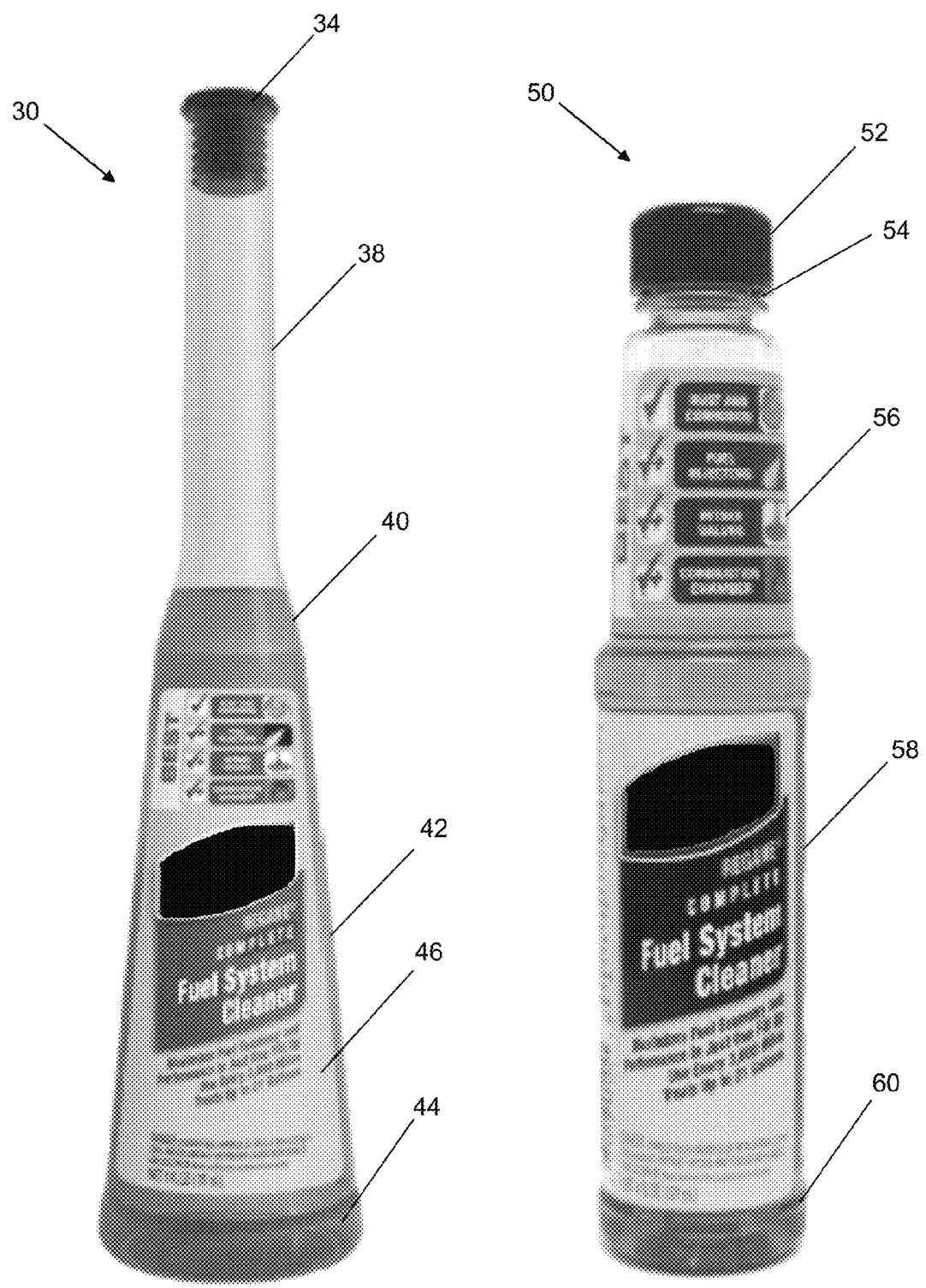
FIG. 7A is a front perspective view of the bottle of FIG. 6A with product labeling applied according to an embodiment of the invention.
FIG. 7B is a front view of the existing product packaging.

FIGS. 6A and 6B show an embodiment of a clear bottle 30 filled with a liquid in the storage portion 42 terminated in a base 44. The smooth elongated neck 38 has internal threads 36 for engaging and securing a cap 34 with threads 35. The elongated neck 38 actuates or pushes the flapper seals open during insertion into a capless filler according to embodiments of the invention. The thinner circular elongated neck 38 transitions in region 40 to the wider storage area 42. FIG. 7A shows the bottle 30 fitted with a label 46 for product description of the liquid in the bottle 30. For comparison, an existing bottle 50 that is not suitable for use with capless filler systems is shown in FIG. 7B. The bottle 50 has external threads 54 for engaging a cap 52, and a short and thick neck 56 that terminates in a storage portion 58 and a base 60. The stout neck 56 will not work with a capless filler system, and the external threads 54 would also not work even if the neck 56 were able to reach the flapper seals.

Figure 8A:
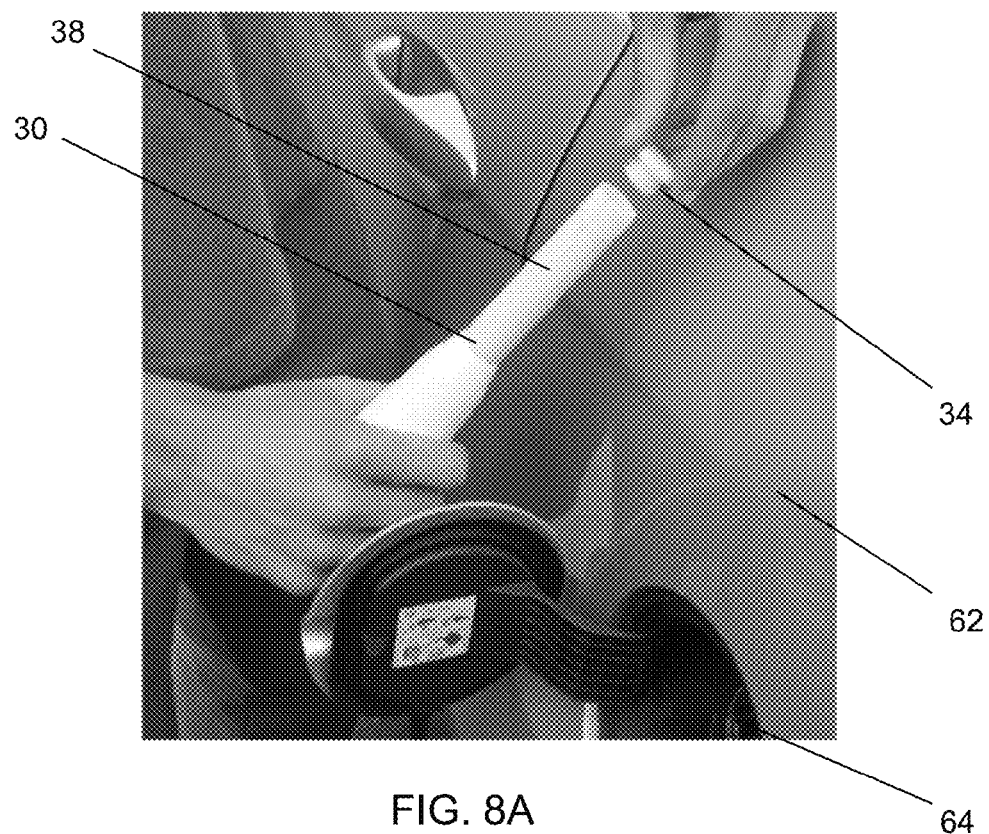
FIGS. 8A and 8B illustrate the process of inserting an embodiment of the inventive bottle into a capless filler system.
Figure 8B:
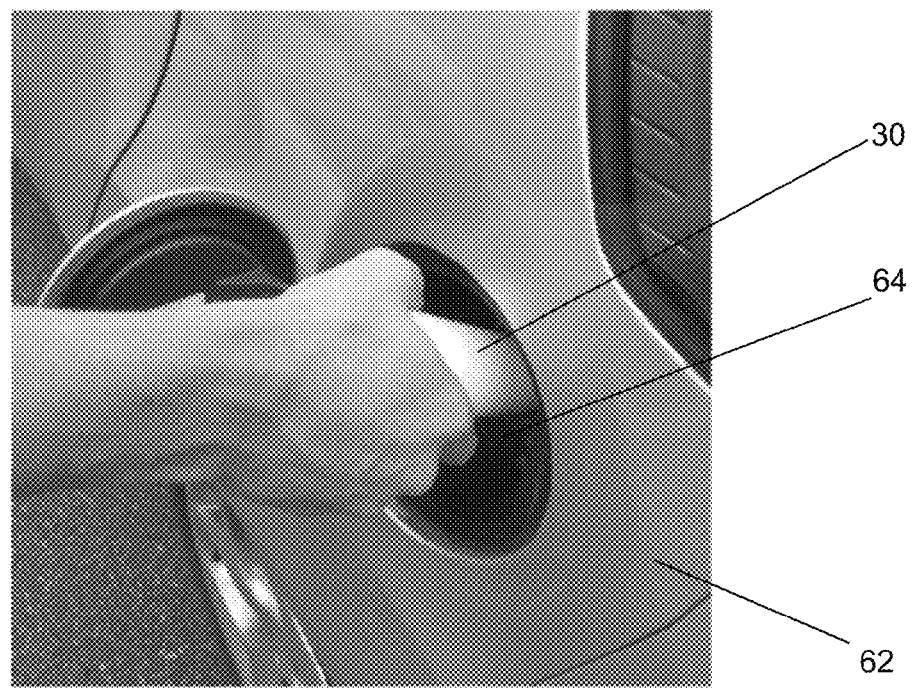

FIGS. 8A and 8B illustrate the use of the inventive bottle 30 with a capless filler 64 of a vehicle 62. In FIG. 8A a user unscrews the cap 34 from the bottle 30, and in FIG. 8B the user inserts the neck 38 of the bottle 30 into the capless filler 64.

The foregoing description is illustrative of particular embodiments of the invention, but is not meant to be a limitation upon the practice thereof. The following claims, including all equivalents thereof, are intended to define the scope of the invention.

The invention claimed is:

1. A method for using a bottle to dispense fuel additives into a capless filler system on a vehicle having one or more flapper seals, said bottle comprising:
   an elongated smooth neck having an exterior surface free of perceptible projections, lumps, or indentations configured for insertion into a capless filler opening to actuate and displace the one or more flapper seals;
   a cap with a first set of screw threads;
   a storage portion in fluid communication with a bottom portion of said neck for holding a liquid; and
   wherein said neck has a top portion with a second set of screw threads on an interior surface of said top portion configured to engage said first set of screw threads to secure said cap to said neck;
   said method comprising:
   opening said bottle by unscrewing the cap from said elongated smooth neck;
   inserting said elongated smooth neck into the capless filler opening; and
   retracting said bottle from the capless filler opening after introducing the liquid held in said bottle.

2. A method for forming a bottle to dispense fuel additives into a capless filler system on a vehicle having one or more flapper seals, said bottle comprising:
   an elongated smooth neck having an exterior surface free of perceptible projections, lumps, or indentations configured for insertion into a capless filler opening to actuate and displace the one or more flapper seals;
   a cap with a first set of screw threads;
   a storage portion in fluid communication with a bottom portion of said neck for holding a liquid; and
   wherein said neck has a top portion with a second set of screw threads on an interior surface of said top portion configured to engage said first set of screw threads to secure said cap to said neck; the method comprising:
   placing a threaded insert into an injection mold;
   introducing a thermoplastic into the injection mold; and
   wherein said threaded insert forms the second set of screw threads on the interior surface of said top portion of the elongated smooth neck of the bottle.

3. The method of claim 2 wherein the thermoplastic is polyethylene terephthalate (PET).

4. The method of claim 2 wherein the thermoplastic is blow molded by at least one of extrusion blow molding, injection blow molding, and injection stretch blow molding.

5. The method of claim 4 further comprising:
   introducing the thermoplastic as a parison;
   clamping the parison into the injection mold;
   heating the parison and applying air pressure into an opening in the parison to expand to match the mold; and
   removing the formed bottle from the mold after the plastic has hardened following cooling.

* * * * *